US007328345B2

(12) United States Patent
Morten et al.

(10) Patent No.: US 7,328,345 B2
(45) Date of Patent: Feb. 5, 2008

(54) METHOD AND SYSTEM FOR END TO END SECURING OF CONTENT FOR VIDEO ON DEMAND

(75) Inventors: Glenn A. Morten, Bellevue, WA (US); Reza P. Rassool, Stevenson Ranch, CA (US); Tom E. Claeys, Clyde Hill, WA (US); Brian Andrew Baker, Mercer Island, WA (US)

(73) Assignee: Widevine Technologies, Inc., Seattle, WA (US)

( * ) Notice: Subject to any disclaimer, the term of this patent is extended or adjusted under 35 U.S.C. 154(b) by 689 days.

(21) Appl. No.: 10/354,920

(22) Filed: Jan. 29, 2003
(Under 37 CFR 1.47)

(65) Prior Publication Data
US 2004/0078575 A1    Apr. 22, 2004

Related U.S. Application Data

(60) Provisional application No. 60/352,710, filed on Jan. 29, 2002.

(51) Int. Cl.
*H04L 9/00* (2006.01)
*H04K 1/00* (2006.01)
*H94L 9/00* (2006.01)
*H04N 7/167* (2006.01)

(52) U.S. Cl. ................ 713/176; 380/278; 380/201; 705/51; 713/179

(58) Field of Classification Search .............. 713/176, 713/179; 380/278, 201; 705/51
See application file for complete search history.

(56) References Cited

U.S. PATENT DOCUMENTS 4,535,355 A    8/1985 Arn et al.

(Continued)

FOREIGN PATENT DOCUMENTS

EP    658054 B1    6/1995

(Continued)

OTHER PUBLICATIONS http://www.ntt.co.jp/news/news02e/0209/020927.html, Sep. 27, 2002.

(Continued)

*Primary Examiner*—Emmanuel L. Moise
*Assistant Examiner*—Techane J. Gergiso
(74) *Attorney, Agent, or Firm*—Darby & Darby PC; Jamie L. Wiegand

(57) ABSTRACT

A system and method for providing end-to-end security of content over a heterogeneous distribution chain is provided. A content owner provides content to an aggregator that receives the content and processes the content. The processing may involve decrypting the content and associating at least one of a unique fingerprint and a watermark to the decrypted content. The unique fingerprint and a watermark to the decrypted content provide identifying characteristics to the content. Additional content-based fingerprints may be used to monitor quality of consumer experience for Video and Audio. The content may be sent in a decrypted state to a client or in an encrypted state. When the content is encrypted the aggregator wraps and encrypts the content with a signature such that an end-to-end flow of the content may be determined. Application Level encryption is used to provide network/distribution medium transparency as well as persistent encryption. When the content is transmitted from a consumer to another consumer the transmitting consumer loses rights to the content.

32 Claims, 10 Drawing Sheets

U.S. PATENT DOCUMENTS

| | | |
|---|---|---|
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,375,168 A | 12/1994 | Kudelski |
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 5,991,399 A | 11/1999 | Graunke et al. |
| 5,995,625 A * | 11/1999 | Sudia et al. ............... 705/51 |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,157,721 A | 12/2000 | Shear et al. |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelmann et al. |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,438,692 B2 * | 8/2002 | Kato et al. ............... 713/176 |
| 6,442,283 B1 * | 8/2002 | Tewfik et al. ............... 382/100 |
| 6,449,367 B2 * | 9/2002 | Van Wie et al. ............ 380/232 |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,560,339 B1 * | 5/2003 | Iwamura ............... 380/201 |
| 6,560,705 B1 * | 5/2003 | Perlman et al. ............. 713/154 |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,634,028 B2 | 10/2003 | Handelmann |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,741,991 B2 * | 5/2004 | Saito ............... 707/9 |
| 6,834,346 B1 * | 12/2004 | Ishibashi et al. ............. 713/179 |
| 6,886,098 B1 * | 4/2005 | Benaloh ............... 713/193 |
| 6,912,512 B2 * | 6/2005 | Miyazaki et al. ............. 705/51 |
| 6,963,972 B1 * | 11/2005 | Chang et al. ............... 713/153 |
| 6,993,133 B1 * | 1/2006 | Nonomura et al. ......... 380/252 |
| 7,024,563 B2 * | 4/2006 | Shimosato et al. ......... 713/186 |
| 7,058,809 B2 * | 6/2006 | White et al. ............... 713/176 |
| 7,111,167 B1 * | 9/2006 | Yeung et al. ............... 713/176 |
| 7,120,251 B1 * | 10/2006 | Kawada et al. ............. 380/201 |
| 7,240,196 B2 | 7/2007 | Cooper et al. |
| 2001/0042043 A1 * | 11/2001 | Shear et al. ............... 705/51 |
| 2001/0044780 A1 * | 11/2001 | Miyazaki et al. ............. 705/53 |
| 2002/0001385 A1 | 1/2002 | Kawada et al. |
| 2002/0003880 A1 * | 1/2002 | Kato et al. ............... 380/201 |
| 2002/0015494 A1 * | 2/2002 | Nagai et al. ............... 380/201 |
| 2002/0015498 A1 | 2/2002 | Houlberg et al. |
| 2002/0021805 A1 | 2/2002 | Schumann et al. |
| 2002/0078178 A1 * | 6/2002 | Senoh ............... 709/219 |
| 2002/0089410 A1 | 7/2002 | Janiak et al. |
| 2002/0095589 A1 * | 7/2002 | Keech ............... 713/189 |
| 2002/0104004 A1 | 8/2002 | Couillard |
| 2002/0107803 A1 * | 8/2002 | Lisanke et al. ............... 705/51 |
| 2002/0141582 A1 | 10/2002 | Kocher et al. |
| 2002/0168082 A1 * | 11/2002 | Razdan ............... 382/100 |
| 2002/0169963 A1 * | 11/2002 | Seder et al. ............... 713/176 |
| 2003/0007568 A1 | 1/2003 | Hamery et al. |
| 2003/0033521 A1 * | 2/2003 | Sahlbach ............... 713/156 |
| 2003/0033529 A1 * | 2/2003 | Ratnakar et al. ............. 713/176 |

FOREIGN PATENT DOCUMENTS

| | | |
|---|---|---|
| EP | 714204 B1 | 5/1996 |
| EP | 0886409 A2 | 12/1998 |
| WO | WO-96/06504 A1 | 2/1996 |
| WO | WO-96/32702 A1 | 10/1996 |
| WO | WO-99/30499 A1 | 6/1999 |
| WO | WO-99/54453 A1 | 10/1999 |
| WO | WO-01/35571 A1 | 5/2001 |
| WO | WO-01/93212 A2 | 12/2001 |
| WO | WO-02/21761 A2 | 3/2002 |

OTHER PUBLICATIONS

Coverage and Generalization in an Artificial Immune System, Balthrop, et al., 2002.

Video Protection by Partial Content Corruption, C. Griwodz, Sep. 1998.

An Overview of Multmedia Content Protection in Consumer Electronics Devices, Eskicioglu et al., no date.

Performance Study of a Selective Encryption Scheme for the Security of Networked, Real-Time Video, Spanos et al., 1995.

Goonatilake, Suran, ed. et al., Intelligent Systems for Finance and Business, 1995, chapters 2-10, pp. 31-173.

Irdeto Access and Optibase create Strategic Alliance—Dec. 14, 2000, http://www.irdetoaccess.com/press/0000041.htm.
System Security, Streaming Media, S. Blumenfeld, Oct. 2001.
http://www.cs.unm.edu/~forest/projects.html, Dec. 2, 2003.
Partial Encryption for Image and Video Communication, H. Cheng, 1998.
A Review of Video Streaming Over the Internet, Hunter et al., Dec. 2, 2003.
Standards Track, Schulzrinne, et al., Apr. 1998, pp. 1-86.
http://www.optibase.com/html/news/December_14_2000.html, Dec. 14, 2004.

Omneon Video Networks Product Announcement, Broadband Streaming, pp. 1-4, no date.
Yoshida, Kazuhiro, et al., "A Continuous-media Communication Method for Minimizing Playback Interruptions", IS&T/SPIE Conference on Visual Communications and Immage Processing, Jan. 1999, San Jose, California, vol. 3653.
Wu, Tsung-Li et al., Selective Encryption and Watermarking of MPEG Video (Extended Abstract), Feb. 17, 1997, International Confernece on Image Science, Systems, and Technology, 10 pgs.

* cited by examiner

METHOD AND SYSTEM FOR END TO END SECURING OF CONTENT FOR VIDEO ON DEMAND

RELATED APPLICATION

This application claims the benefit of U.S. Provisional Application No. 60/352,710, filed Jan. 29, 2002, the benefit of the earlier filing date of which is hereby claimed under 35 U.S.C. § 119 (e).

FIELD OF THE INVENTION

The present invention relates generally to digital copy protection and more particularly to end-to-end digital copy protection for on demand architectures.

BACKGROUND OF THE INVENTION

Recent advances in the telecommunications and electronics industry, and, in particular, improvements in digital compression techniques, networking, and hard drive capacities have led to growth in new digital services to a consumer's home. For example, such advances have provided hundreds of cable television channels to consumers by compressing digital data and digital video, transmitting the compressed digital signals over conventional coaxial cable television channels, and then decompressing the signals in the consumer's receiver. One application for these technologies that has received considerable attention recently includes video-on-demand (VOD) and everything-on-demand (EOD) systems where a consumer communicates with a service operator to request video content and the requested content is routed to the consumer's home for enjoyment. The service operator typically obtains the content from an upstream content provider, such as a content aggregator or distributor. The content aggregators, in this market stream, in turn, may have obtained the content from one or more content owners, such as movie studios.

While the video-on-demand market stream provides new opportunity for profits to content owners, it also creates a tremendous risk for piracy of the content. Such risk for piracy may arise at any place in the market stream that the content is exposed. Without appropriate protection, the content can be illicitly intercepted, stolen, copied, and redistributed, thus depriving content owners of their profits.

Current approaches to protecting the video content provide only partial or incomplete solutions. For example, one approach includes pre-encryption of the content before it's stored on a server at various locations in the market stream. However, once an aggregator, service provider, or customer wishes to view the content, it must be decrypted. Once the content is decrypted, it becomes exposed to potential piracy. Moreover, the content owner may be unable to determine where in the market stream the security breach occurred; thereby leaving the content owner vulnerable to future loses.

Therefore, there is a need in the art for a method and system for providing end-to-end security of content in video-on-demand systems. It is with respect to these considerations and others that the present invention has been made.

SUMMARY OF THE INVENTION

The present invention is directed at addressing the above-mentioned shortcomings, disadvantages and problems, and will be understood by reading and studying the following specification.

Briefly stated, the present invention is directed at providing a method and system for end-to-end securing of content in a video-on-demand (VoD) ) and everything-on-demand (EOD) system. VOD may be done with centralized or decentralized stores. This applies to true VOD and broadcast content that may later be stored in a local or network based Personal Video Recorder (PVR).

According to aspects of the invention, a system and method is provided that is directed at providing end-to-end security of content over a network. A content owner provides content to an aggregator that receives the content and processes the content. The processing may involve taking a unique fingerprint, decrypting the content and adding a watermark to the decrypted content. The unique fingerprint and a watermark to the decrypted content provide identifying characteristics to the content. The content may be sent in a decrypted state to a client or in an encrypted state. When the content is encrypted the aggregator wraps and encrypts the content with a signature such that an end-to-end flow of the content may be determined. When the content is transmitted from a consumer to another consumer the transmitting consumer loses rights to the content.

According to another aspect of the invention, a key manager and key exchange manager are arranged to manage encryption keys and decryption keys, the decryption keys relating to content that has been encrypted by an upstream provider, and the encryption keys that are used for distribution of the content.

According to yet another aspect of the invention, the fingerprint is configured to identify the recipient of the content or the source of the content and to provide a baseline for Forensics and Quality of Service (QoS) monitoring.

According to still yet another aspect of the invention, the content is watermarked such that a distribution path, service provider, and consumer in a market stream relating to the content are uniquely identified.

According to another aspect, a bridge and a key exchanger are configured to encrypt the content as it is transmitted to a downstream recipient.

According to yet another aspect, further comprising a QOS API configured to enable selection of Quality of Service profiles based on system and content attributes. The QOS API may also provide an upstream content provider with information concerning the unencrypted content.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification, the term "connected" means a direct connection between the things that are connected, without any intermediary devices or components. The term "coupled," means a direct connection between the things that are connected, or an indirect connection through one or more either passive or active intermediary devices or components. The meaning of "a," "an," and "the" include plural references. The meaning of "in" includes "in" and "on." The term "service operator" means. The term "content owner" refers to producers, developers, and owners of digital content, that may include, but is not limited to, video, audio, graphical, and text content. The term "aggregator" refers to individuals or entities that obtain rights to distribute video content from content owners. The term "consumer" means an individual or entity that desires to retrieve content from the content owner. The term "service operator" is an individual or entity that is directed at providing content to consumers. The term "watermark" refers to a digital signal or pattern that is inserted into content, such as a digital image, audio, or video content. The term "fingerprint" refers to some measurable characteristics of the content.

Briefly stated, the present invention is directed at providing a method and system for end-to-end securing of content in a video-on-demand (VoD) system or EOD.

Figure 1:
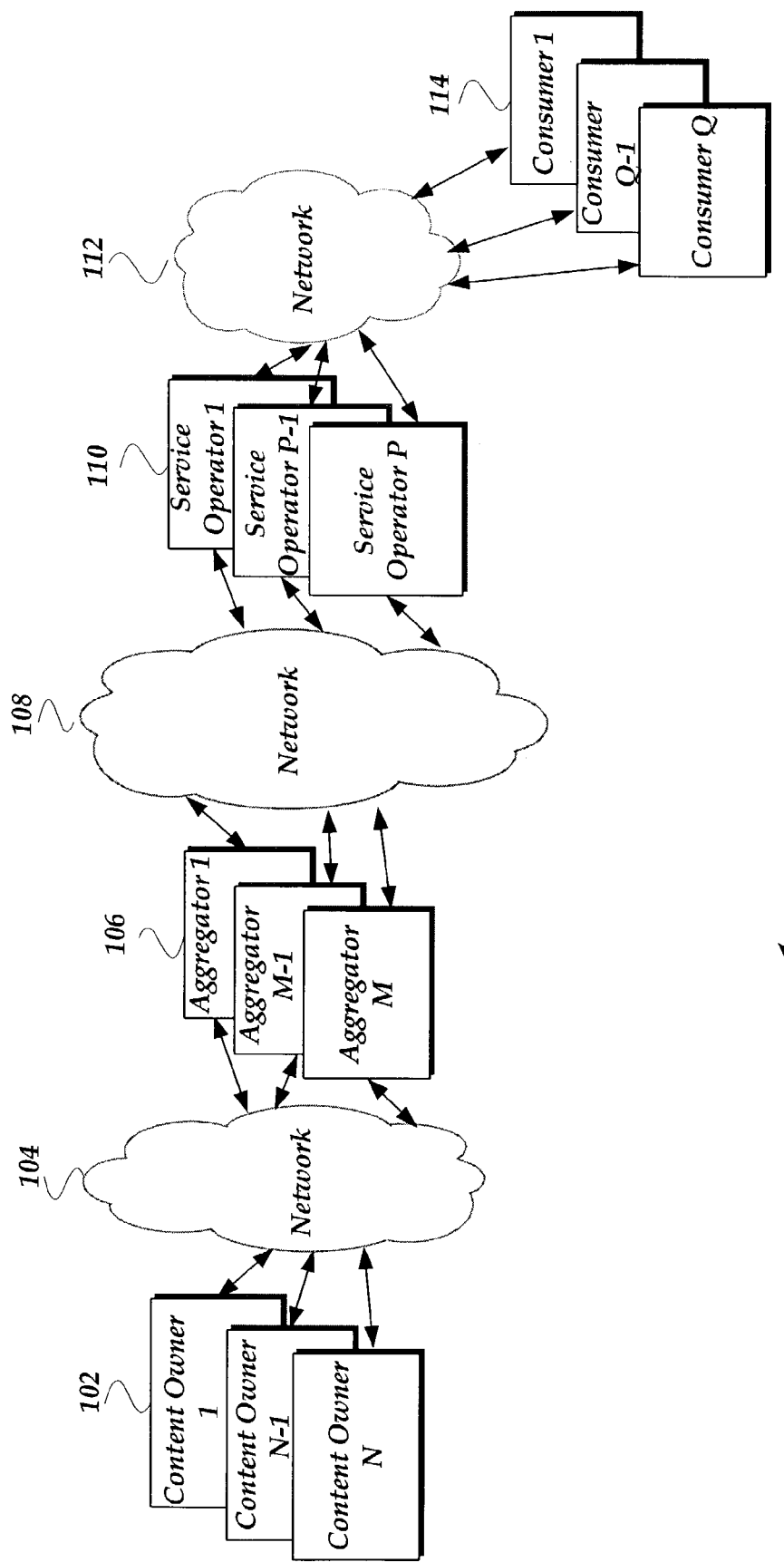
FIG. 1 is a functional block diagram illustrating an exemplary operating environment 100 in which the invention may be implemented.

FIG. 1 is a functional block diagram illustrating an exemplary operating environment 100 in which the invention may be implemented, in accordance with the present invention. The operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes content owner(s) 102 (1 through N), aggregator(s) 106 (1 through M), service operator(s) 110 (1 through P), consumer(s) 114 (1 through Q), and networks 104, 108, and 112.

Content owner(s) 102 (1 through N) are coupled to and in communications with network 104. Aggregator(s) 106 (1 through M) are coupled to and in communications with network 104 and network 108. Service operator(s) 110 (1 through P) are coupled to and in communications with network 108 and network 112. Consumer(s) 114 (1 through Q) are coupled to and in communications with 114.

Content owner(s) 102 (1 through N) include producers, developers, and owners of video content for consumer 114. Such content includes pay-for-view or time and subscription television, movies, interactive video games, interactive news television, catalogue browsing, distance learning, video conferencing, and the like. It is apparent that on demand content owned by content owner(s) 102 is not limited to video content only, and may include audio only services, without departing from the scope or spirit of the present invention. Thus, video content is intended to include, but not limited to, audio, video, still images, text, graphics, and other forms of content directed towards a consumer.

Aggregator(s) 106 (1 through 6) include distributors and other businesses that obtain rights to distribute video content from content owner(s) 102. Aggregator 106 may obtain the rights to distribute from one or more content owners. Aggregator(s) 106 may also repackage, store, and schedule video content for subsequent sale or license to other aggregator(s) 106 and service operator(s) 110. Moreover, it is apparent that content owner 102 may function in the role of both a content owner and an aggregator or distributor of video content.

Service operator(s) 110 include businesses that are directed at providing content to consumer(s) 114 (1 through Q). Service operator 110 includes businesses that provide and manage the infrastructure between consumer 114 and service operator 110's facilities. Moreover, it is apparent that content owner 102 or aggregator 106 may function in the role of service operator without departing from the spirit or scope of the present invention.

Consumer(s) 114 (1 through Q) include end-users and consumers of content. Consumer(s) 114 may employ various devices to enjoy the content, including but not limited to television appliances, digital recorders, set-top boxes, mobile devices, PDAs, personal computers, jukeboxes, and the like. Consumer 114 may request content delivery directly from content owner 102, or at any point along the market stream. For example, consumer may request content delivery from aggregator 106, or service operator 110. Moreover, consumer 114 may receive content through multiple sources within the market stream. Additionally, consumer(s) 114 may select to transfer or share content between other consumers. Finally, consumer 114 may select to pay for content out of band of operating environment 100, or through networks 104, 108, and 112 to an upstream market seller.

Networks 104, 108, and 112 can employ any form of computer readable media for communicating information from one electronic device to another. Also, networks 104, 108, and 112 can include the Internet in addition to local area networks (LANs), wide area networks (WANs), direct or indirect connections, such as through a universal serial bus (USB) port, other forms of computer-readable media, Digital Video Disk (DVD), or any combination thereof. On an interconnected set of LANs, including those based on differing architectures and protocols, a router acts as a link between LANs, enabling messages to be sent from one to another.

Communication links within networks 104, 108, and 112 typically include fiber, twisted wire pair or coaxial cable, while communication links between networks may utilize analog telephone lines, full or fractional dedicated digital lines including T1, T2, T3, and T4, Integrated Services Digital Networks (ISDNs), Digital Consumer Lines (DSLs), wireless links including satellite links, fiber, Asymmetric Digital Consumer Lines (ADSL), or other communications links known to those skilled in the art. Furthermore, remote computers and other related electronic devices can be remotely connected to other networks via a modem and telephone link, providing a modulated data signal such as a carrier wave or other transport mechanism or information delivery media.

The term "modulated data signal" means a signal that has one or more of its characteristics set or changed in such a manner as to encode information in the signal. Carrierless AM/PM (CAP), Discrete Multitone Transmission (DMT), and Frequency Division Multiplexing (FDM) may be included as modulation techniques employed to generate the modulated data signal to transport video content through operating environment 100 of FIG. 1.

Figure 2:
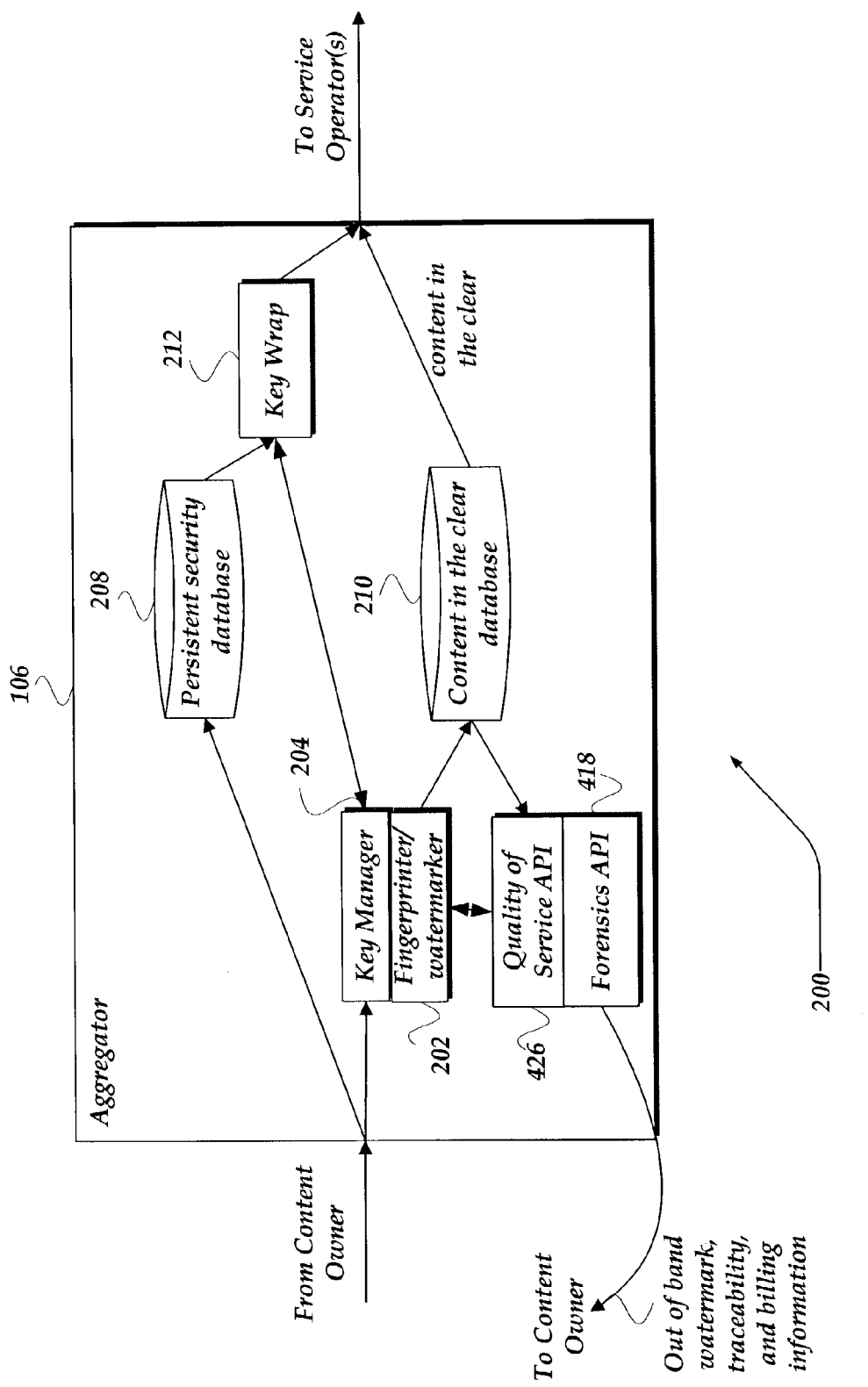
FIG. 2 is a functional block diagram of an embodiment of an aggregator employing components for securing content in video-on-demand systems.

FIG. 2 is a functional block diagram of an embodiment of an aggregator 106 employing components for securing content in video-on-demand systems, in accordance with the present invention. As shown in the figure, aggregator 106 includes key manager 204, fingerprinter/watermarker 202, Quality of Service Application Program Interface (API) 426, Forensics API 418, Persistent security database 208, content in the clear database 210, and key wrap 212. Aggregator 106 may include more security components than shown in the figure (see FIG. 4 and related discussion for additional security components).

Aggregator 106 is configured to receive content from content owner(s) 102 (1 through N) through a network, such as network 104. Typically, the content is encrypted, by an upstream provider, such as content owner(s) 102 (1 through N).

Aggregator 106 may desire to decrypt the video content for various reasons. For example, aggregator 106 may wish to examine the quality of the video content prior to payment. Moreover, aggregator 106 may have a connection to service operator 110 that precludes transmission of encrypted content, or this connection may contain legacy conditional access solutions that require trans-encryption into different encryption properties. Whatever the reason, aggregator 106 may also wish to store the content in the clear, as unencrypted content.

Key manager 204 includes software and/or hardware components to manage encryption/decryption keys for aggregator 106. Typically, key manager 204 includes management of the symmetric keys of content and asymmetric keys that may be employed for signing of video content or key exchange. Key manager 204, together with a key exchange (not shown), is configured to manage decryption keys for content that has been encrypted by an upstream provider such as content owner 102, as well as manage encryption keys for distribution to service operators 110. Key exchange is described below in conjunction with FIG. 4.

Fingerprinter/watermarker 202 includes software and/or hardware components configured to provide fingerprinting and watermarking of content received that has been decrypted by key manager 204.

Because the watermark is not present in unaltered copies of the original content, the watermark may serve as a type of digital signature for the copied content. For example, watermarking may be employed to embed copyright notices to the content. A given watermark may be unique to each copy of the content so as to identify the intended recipient, or be common to multiple copies of the content such that the content source may be identified.

A fingerprint may be created by including a "decoder" within a content file. This "decoder" can be decoded to extract the message the creator made. A fingerprint can be embedded in the content substantially like a watermark (in this case a fingerprint will sometimes be referred to as a watermark) but it can also just be attached to the content, unlike a watermark. Moreover, watermarks and fingerprints may be invisible to the casual observer, further facilitating the claim of ownership, receipt of copyright revenues, or the success of prosecution for unauthorized use of the video content. According to one embodiment of the invention, decrypted video content is both watermarked and fingerprinted by fingerprinter/watermarker 202 to uniquely identify the distribution path and the service provider in the market stream that decrypted the video content. A fingerprint is also made of the characteristics identifying the authorized decryption agent and can be watermarked at decryption time in order to identify the last known authorized agent to handle the content. This enables the Forensics API 418 to be used in the identification during a breach of security.

Fingerprinter 202 may also take a fingerprint of the digital content for use by the QoS Manager 428 to compare the decrypted content with baseline fingerprints taken before encryption in order to provide an automated QoS check of the content before provisioning the content database(s).

Unencrypted content that has been fingerprinted and/or watermarked by fingerprinter/watermarker 202 may be stored in a data store, such as Content in the Clear database 210. Content in the clear database 210 may include hardware and related software configured to save unencrypted content for aggregator 106.

Quality of Service API 426 and Forensics API 418 are described in more detail below in conjunction with FIG. 4. Briefly, however, Quality of Service API 426 and Forensics API 418 include hardware and related software directed towards providing market upstream content providers, such as content owner(s) 102, with information concerning the unencrypted content. Such information may include information about the watermark or fingerprint included in the content as well as registration and billing information, that content owner 102 may wish to track.

Persistent security database 208 includes hardware and related software directed towards receiving and storing of encrypted video content.

Key wrap 212 includes hardware and related software configured to provide an encryption key wrap to encrypted video content as the content is communicated to a market downstream recipient, such as service operator(s) 110.

Figure 3:
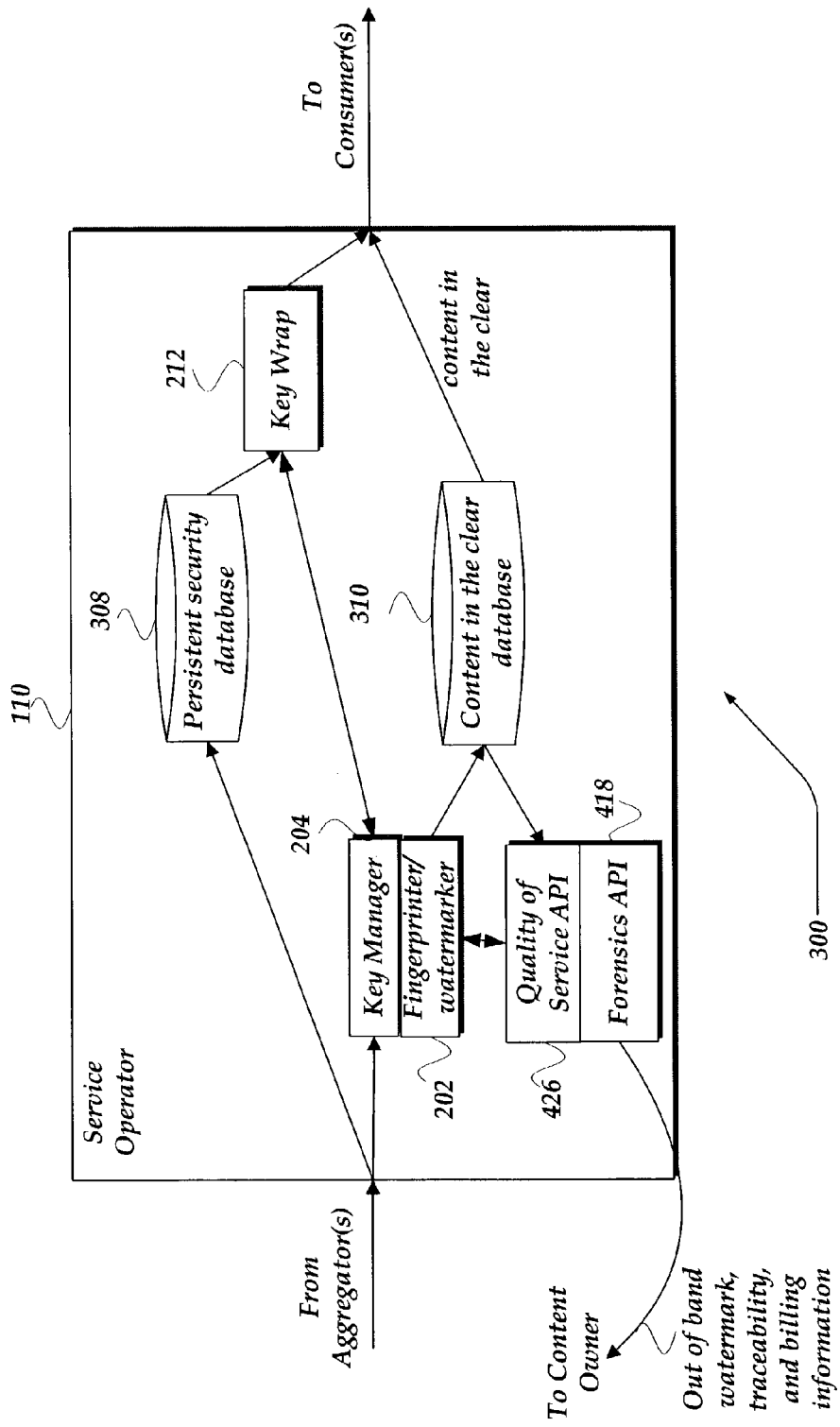
FIG. 3 is a functional block diagram of an embodiment of a service operator employing components for securing content in video-on-demand systems.

FIG. 3 is a functional block diagram of an embodiment of service operator 110 employing components for securing content in video-on-demand systems, in accordance with the present invention.

As shown in the figure, service operator 110 includes substantially the same security components as aggregator 106, shown in FIG. 2. Service operator 110 may include more security components than shown in the figure (see FIG. 4 and related discussion for additional security components). Moreover, service operator 110 in FIG. 3 receives content from an upstream market supplier, such as aggregator 106, and in turn provides the content to consumer(s) 114. Service operator 110 may also provide content to other service operator(s) 110.

VoD Content Protection Components

Figure 4:
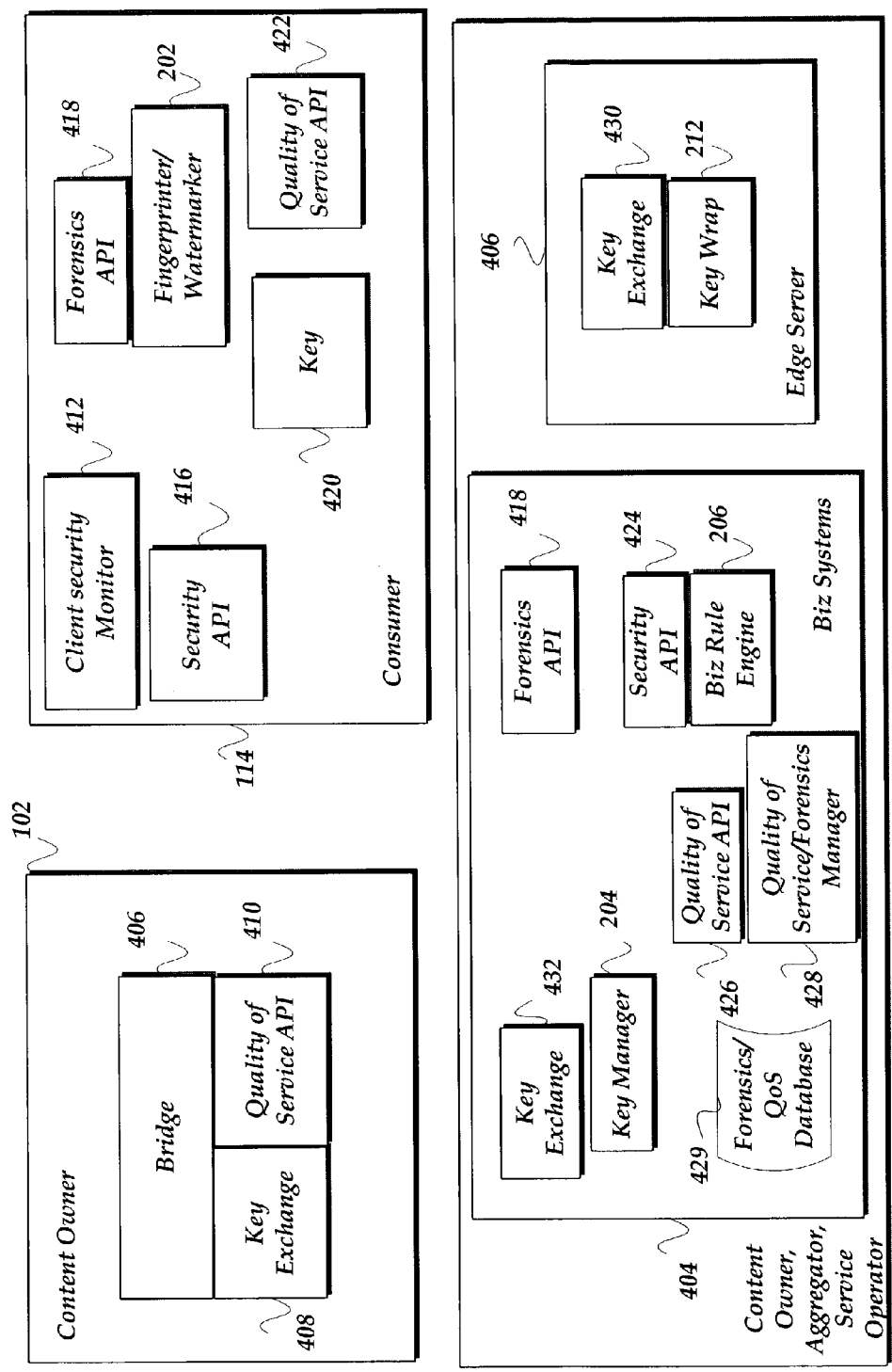
FIG. 4 is a functional block diagram of an embodiment illustrating end-to-end components in an illustrative environment.

FIG. 4 is a functional block diagram of an embodiment illustrating end-to-end security components in an illustrative environment for various content providers, in accordance with the present invention. The following is a description of a set of end-to-end security components that are employed in operating environment 100 of FIG. 1 and are directed towards providing an extensive security solution from one end to the other end of the video content market stream.

As shown in FIG. 4, security components are included in content owner 102, consumer 114, and content owner/aggregator/service operator 402. Content owner/aggregator/service operator 402 is intended to illustrate components that may be included in content owner 102, aggregator 106, and service operator 110.

Content owner 102 includes bridge 406, key exchange 408, and quality of service API 410. Consumer 114 includes Security API 416, Client security monitor 412, forensics API 418, fingerprinter/watermarker 202, key 420, and quality of service API 422. Content owner/aggregator/service operator 402 may also include Biz systems 404 and Edge Server(s) 406. Biz systems 404 includes forensics API 418, key exchange 432, key manager 204, security API 424, Biz Rule Engine 206, quality of service API 426, Forensic/QoS Database 429 and quality of service/forensics manager 428. Edge Server(s) 406 includes key exchange 430, and key wrap 212.

Although security components may be illustrated within a single content provider and not another, the present invention is not so limited. For example, fingerprinter/watermarker 202 may be included within content owner/aggregator/service operator 402 without departing from the scope or spirit of the present invention.

Key exchanges 408, 432, and 430 are substantially similar to key exchange 204 described above in conjunction with FIG. 2.

Bridge 406 includes hardware and related software directed towards providing encryption 'on the fly' and/or pre-encryption of content as content owner 102 communicates the content to a downstream recipient. According to one embodiment of the invention, bridge 406 provides on the fly encryption for video content. Another embodiment of the encryption bridge 406 provides file based pre-encryption. In either embodiment selective or application level encryption is employed in order to provide network/distribution mechanism transparency and allow for persistent encryption for the content.

Figure 10:
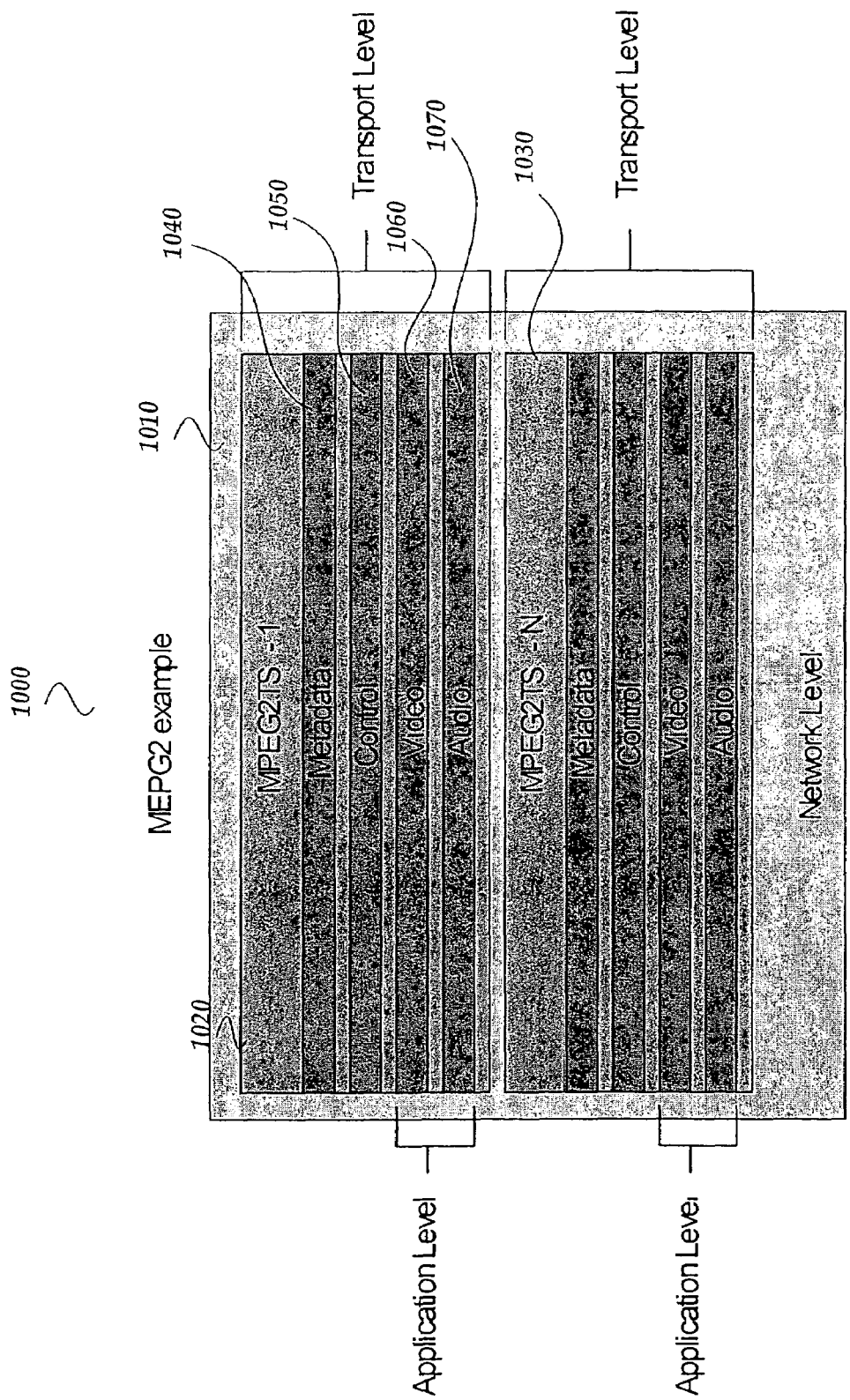
FIG. 10 defines selective or application level encryption and differentiates between traditional network and transport-based methods in accordance with aspects of the present invention.

FIG. 10 defines selective or application level encryption and differentiates between traditional network and transport-based methods. In FIG. 10 a MPEG 2 1000 is used as an example. Network Level 1010 contains one or more MPEG 2 Streams Multiplexed together. Encryption may be applied at the network level obscuring the details of content 1060 and 1070, destination, control 1050 and descriptive information about the contents 1040 of the network pipe. This level of encryption is highly dependent on the network protocols and equipment. This level of encryption protects the link and not persistent content. Within the multiplex are one or more MPEG2 Transport Streams 1020 and 1030. Encryption may be applied at the transport level obscuring the details of content 1060 and 1070, control 1050 and descriptive information about the contents 1040 of the transport stream. This level of encryption is highly dependent on the transport protocols and equipment. This level of encryption protects the link and not persistent content. Application Level encryption protects the content persistently and transparently by encrypting the Video 1060 and audio 1070 components of the streams. Metadata 1040 and control 1050 are left in the clear. In FIG. 10, MPEG2 is used as an example only. Application level encryption can be employed with any media type: MPEG1, MPEG3, MPEG4, Windows Media, Real, QuickTime, data, and other multimedia files or streams.

Referring back to FIG. 4, Quality of Service Application Program Interface (API) 410, 426, and 422 includes software directed at providing a level of abstraction from the underlying implementations of components on a device. Quality of Service API 410, 426, and 422 enables selection of Quality of Service profiles based on system and content attributes, such as video content, audio content, and the like, and other predefined profiles describing Quality of Service attributes. Moreover, Quality of Service API 410, 426, and 422 enables leveraging of existing domain security infrastructures for the authorization of Quality of Service requests, negotiating of bandwidth for Quality of Service requests, and providing of feedback on business and system attributes of Quality of Service services. Quality of Service API 410, 426, and 422 may enable monitoring of attributes of data transfers, such as the number of content packets or bytes received per unit of time. The Quality of Service API 410, 426, and 422 in conjunction with the Fingerprinter 202 can be used to compare the video or audio quality of decrypted content and subsequently report the quality of the consumer experience. Moreover, Quality of Service API 410, 426, and 422 may also provide billing information to a requesting upstream market content provider.

Quality of Service Manager 428 includes hardware and related software configured to provide a policy based, independent management of the quality of services that will be monitored or managed through Quality of Service APT 426 (410 or 422).

Security API 416 and 424 include software configured to enable, among other actions, maintenance of access to content, application privileges. Security API 416 and 424 for example may include APIs configured to delete a consumer's access privileges to certain video content where it is determined that the consumer is attempting to perform unauthorized actions on the video content.

Forensics API 418 includes hardware and related software directed towards logging of actions by consumer 114, and providing logged reports to an upstream video content provider, such as content owner(s) 102 (1 through N), illustrated in FIG. 1. The logged reports may include such actions as what video content was viewed, when it was viewed, and how much of the video content was viewed during a given period of time. Moreover, forensics API 418 may be enabled to provide watermark and fingerprint traceability information to a requesting upstream video content provider.

Client security monitor 412 includes hardware and related software configured to enable tamper evidence monitoring of actions by consumers. When client security monitor 412 determines that an unauthorized consumer action has been performed, a message is communicated through Security API 416 (or 424) to the Biz Rule Engine 206 for determination of tamper response directing Security API 416 (or 424) to take a predetermined action.

Key 420 includes the actual private key employed to initiate the key unwrap process for content decryption and sign video fingerprint. Key 420 may be implemented in any of a number of encryption techniques, including, but not limited to, RSA, ECC, DVB, DES, Triple DES, and AES.

Biz Rule Engine 206 includes software and related hardware configured to, among other actions, direct other components to take a predetermined action in response to a detection of tampering of video content. For example, biz rule engine 206 may direct components in a system to log additional information, cease streaming of video content, revoke credentials, shutdown or disable one or more processes, and the like.

Generalized Operation

The generalized operation of one exemplary embodiment will now be described with respect to FIGS. 1-4, in accordance with the present invention.

As shown in FIG. 1, content owner 102 (N) may select to provide video content to aggregator 106 (M) through network 104. In so doing, content owner 102 (N) may employ bridge 406, and key exchange 408 (FIG. 4) to encrypt the video content as it is transmitted to aggregator 106 (M)).

As the encrypted video content is received, aggregator 106 (M) stores it in persistent security database 208 (FIG. 2). If aggregator 106 (M) wishes to inspect the encrypted video content, key manager 204 together with a decryption client (not shown) is employed to decrypt the video content. As the video content is decrypted, fingerprinter/watermarker 202 associates a unique fingerprint and watermark. The fingerprinted and watermarked unencrypted video content is stored in Content in the Clear database 310.

Quality of Service API 426 and forensics API 418 may provide market upstream content providers, such as content owner(s) 102, with information concerning the unencrypted video content. As described above, information provided to a market upstream content provider may include watermark/fingerprint traceability information, as well as registration and billing information.

Aggregator 106 (M) may select to transmit video content in the clear (unencrypted) to service operator(s) 110. Aggregator 106 (M) may also select to transmit encrypted video content to service operator(s) 110. If aggregator 106 (M) selects to transmit encrypted video content, the encrypted video content is communicated to key wrap 212 wherein the encrypted video content is 'wrapped' with a signed and encrypted wrapper. Key wrap is described below in more detail in conjunction with FIG. 5.

As the video content is received by service operator(s) 110, substantially similar processes as described above may be performed, until the video content is transmitted to consumer(s) 114.

Key Wrap of Video Content

Figure 5:
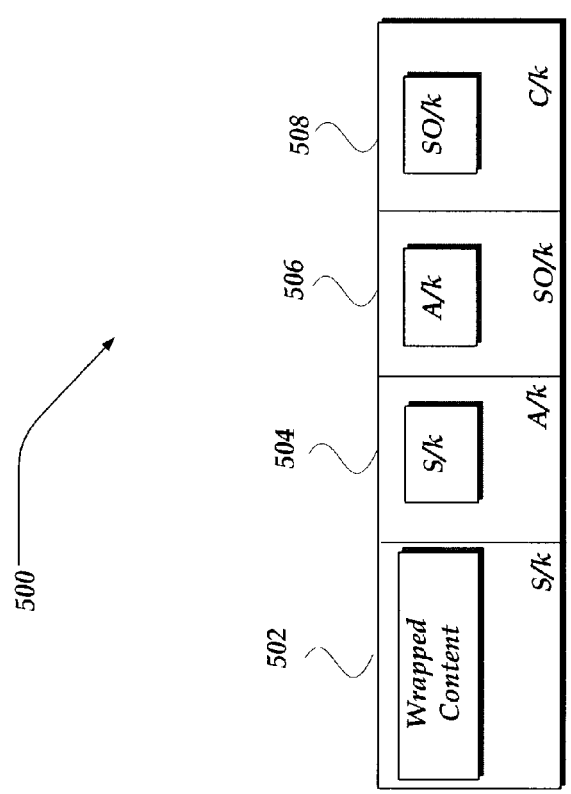
FIG. 5 is a diagram of an embodiment of a key wrap data format.

FIG. 5 is a diagram of an embodiment of a key wrap data format, in accordance with the present invention. As shown in the figure, key wrap data format 500 includes wrapped (encrypted) content 502, and key wrappers 504, 506, and 508.

Wrapped content 502 includes content that has been encrypted typically by content owner 102 N's symmetric encryption key, S/k.

Key wrapper 504 includes content owner 102 N's symmetric encryption key S/k, that has been encrypted by aggregator 106 M's encryption key, A/k Key wrapper 506 includes aggregator 106 M's session key, encrypted by service operator 110 P's encryption key, SO/k. In a substantially similar approach, key wrapper 508 includes service operator 110 P's session key, encrypted with consumer 114 Q's encryption key, C/k.

By wrapping and attaching the upstream content provider's encryption keys with the recipient's key and identifiers a content owner may later determine the end-to-end flow of the content.

Digital Rights Transfer

Figure 6:
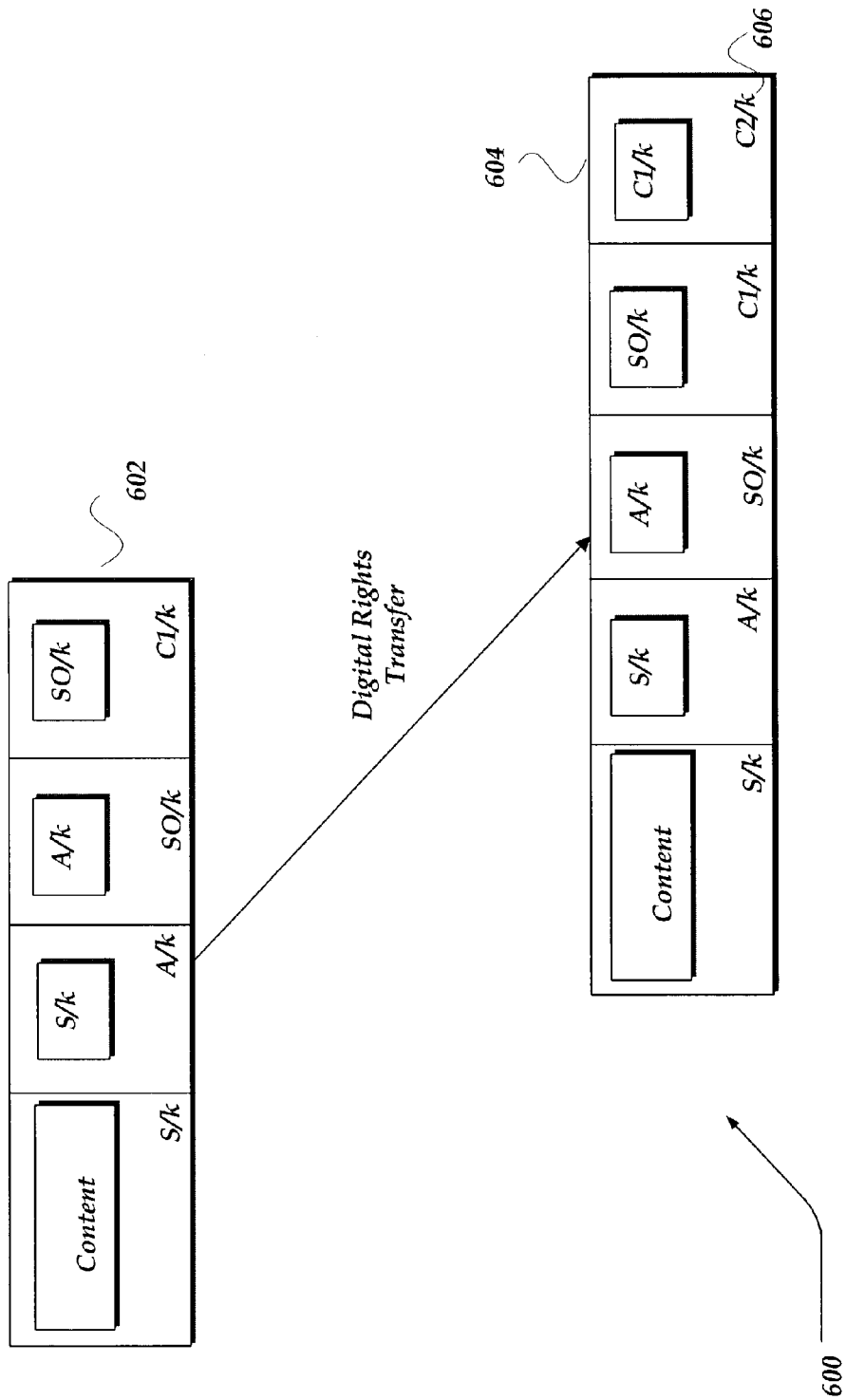
FIG. 6 is a diagram of an embodiment illustrating digital rights transfers employing key wrapping at consumer sites.

FIG. 6 is a diagram of an embodiment illustrating digital rights transfers employing key wrapping at consumer sites, in accordance with the present invention. As shown in the figure, key wrap data format 602 and 606 are substantially similar to key wrap data format 500 described in conjunction with FIG. 5, above.

If a consumer, such as consumer 114 (1), desires to transfer content to another consumer, such as consumer 114 (2), consumer 114 (1) will enable key wrap 212 (FIG. 4) to perform key wrap, on key wrap data format 602, adding consumer 114 (1)'s session key, C1/k, encrypted by consumer 114 (2)'s encryption key, C2/k, to generate key wrap data format 606.

Moreover, during digital rights transfer key wrap data format 602 is deleted from consumer 114 (1)'s system. The transfer of the content is also logged for later communication with content owner(s) 102.

System Overview

FIGS. 1-3 illustrate an exemplary environment for practicing the invention. Aspects of the present invention are embodied in a World Wide Web (WWW) site accessible via the Internet according to one embodiment of the invention. Generally, the term "Internet" refers to the worldwide collection of networks and gateways that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational and other computer systems, that route data and messages. A representative section of the Internet 100 is shown in FIG. 1. The environment is not limited to the Internet but may also include private networks or distribution mediums like DVD, Tape and other offline distribution methods.

Illustrative Operating Environment

Figure 7:
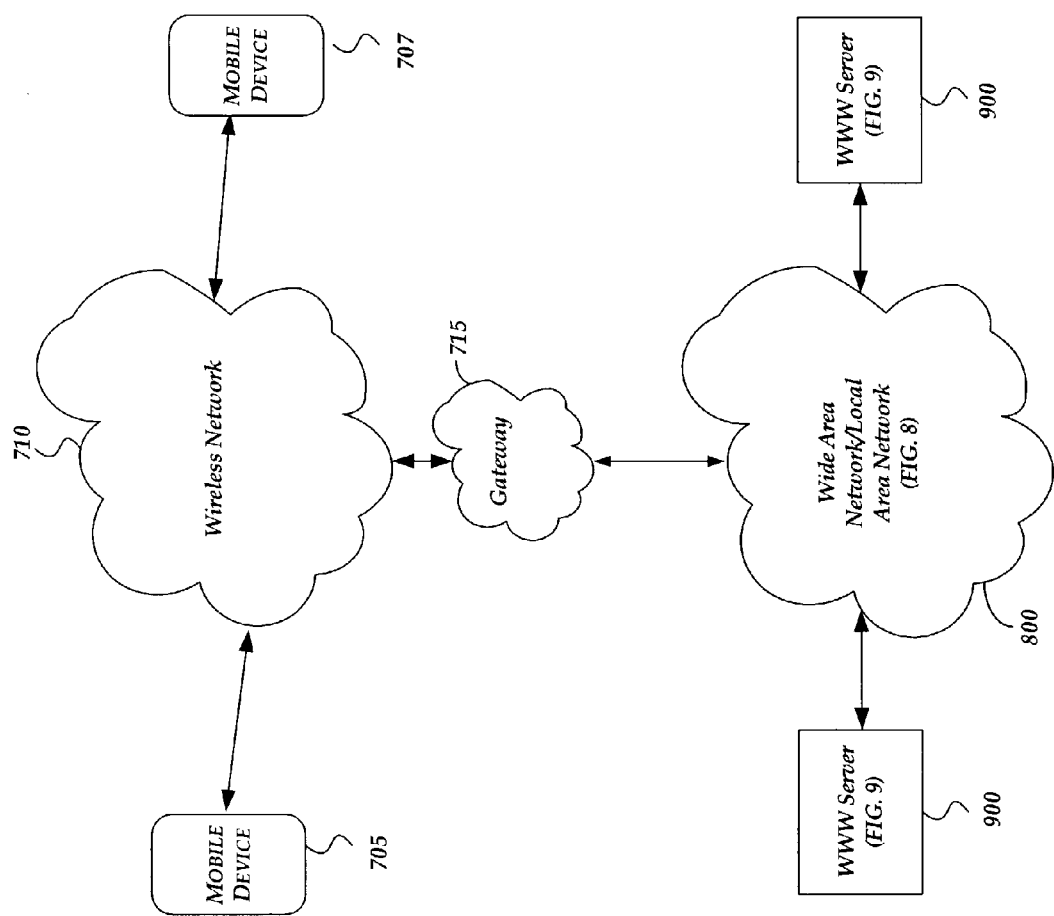
FIGS. 7-9 show an illustrative operating environment.

With reference to FIG. 7, an exemplary system in which the invention may operate includes mobile devices 705 and 707, wireless network 710, gateway 715, wide area network (WAN)/local area network (LAN) 800 and one or more world wide web (WWW) servers 900.

Mobile devices 705 and 707 are coupled to wireless network 710. Generally, mobile devices include any device capable of connecting to a wireless network such as wireless network 710. Such devices include cellular telephones, smart phones, pagers, radio frequency (RF) devices, infrared (IR) devices, citizen band radios (CBs), integrated devices combining one or more of the preceding devices, and the like. Mobile devices may also include other devices that have a wireless interface such as PDAs, handheld computers, personal computers, multiprocessor systems, microprocessor-based or programmable consumer electronics, network PCs, wearable computers, and the like.

Wireless network 710 transports information to and from devices capable of wireless communication, such as mobile devices 705 and 707. Wireless network 710 may include both wireless and wired components. For example, wireless network 710 may include a cellular tower that is linked to a wired telephone network. Typically, the cellular tower carries communication to and from cell phones, pagers, and other wireless devices, and the wired telephone network carries communication to regular phones, long-distance communication links, and the like.

Wireless network 710 may be coupled to WAN/LAN through gateway 715. Gateway 715 routes information between wireless network 710 and WAN/LAN 800. For example, a user using a wireless device may browse the Internet by calling a certain number or tuning to a particular frequency. Upon receipt of the number, wireless network 710 is configured to pass information between the wireless device and gateway 715. Gateway 715 may translate requests for web pages from wireless devices to hypertext transfer protocol (HTTP) messages, which may then be sent to WAN/LAN 800. Gateway 715 may then translate responses to such messages into a form compatible with the requesting device. Gateway 715 may also transform other messages sent from mobile devices into information suitable for WAN/LAN 800, such as e-mail, audio, voice communication, contact databases, calendars, appointments, and the like.

Figure 8:
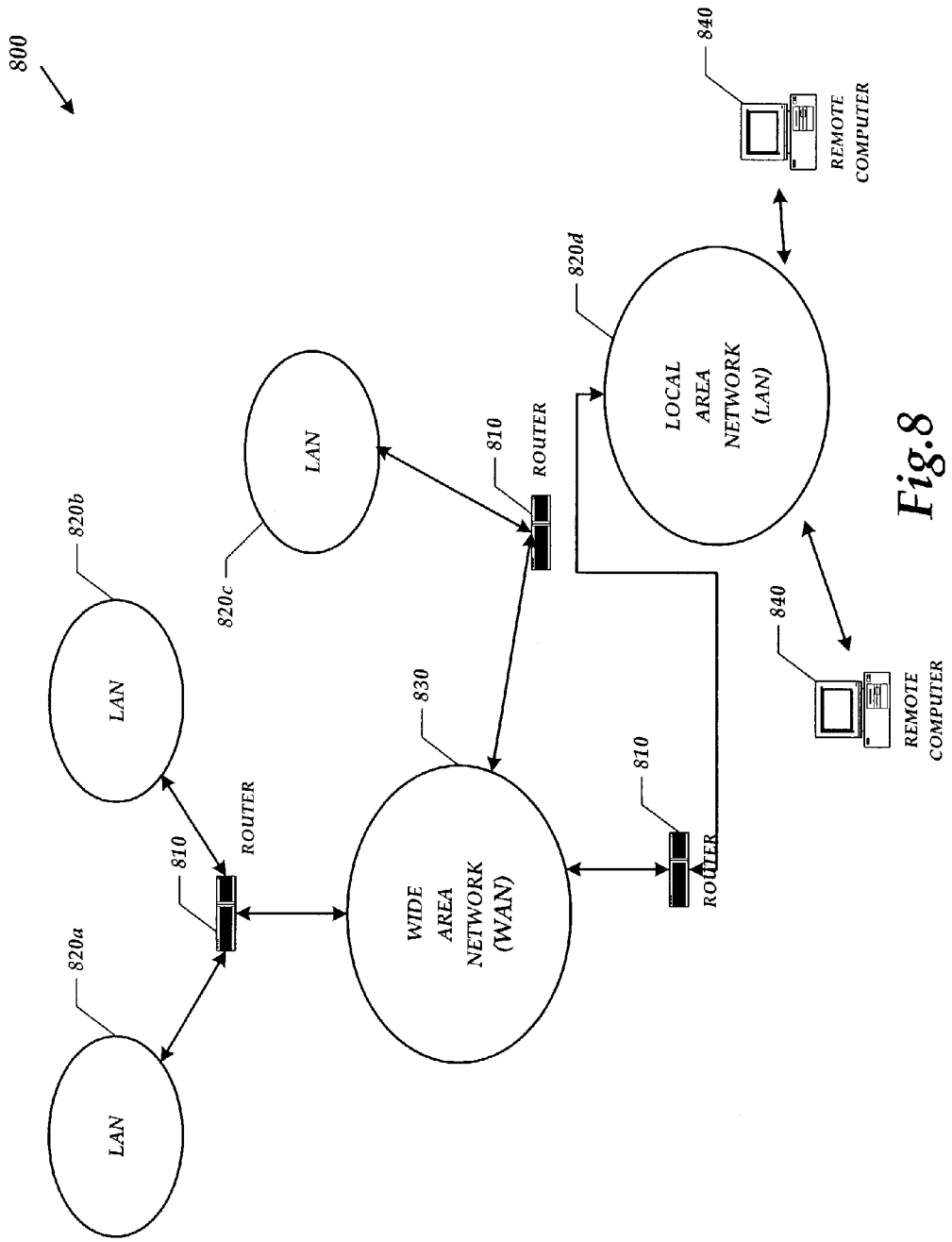

Typically, WAN/LAN 800 transmits information between computing devices as described in more detail in conjunction with FIG. 8. One example of a WAN is the Internet, which connects millions of computers over a host of gateways, routers, switches, hubs, and the like. An example of a LAN is a network used to connect computers in a single office. A WAN may connect multiple LANs.

WWW servers 900 are coupled to WAN/LAN 800 through communication mediums. WWW servers 900 provide access to information and services as described in more detail in conjunction with FIG. 9.

FIG. 8 shows another exemplary system in which the invention operates in which a number of local area networks ("LANs") $820_{a-c}$ and wide area network ("WAN") 830 interconnected by routers 810. Routers 810 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links. Furthermore, computers, such as remote computer 840, and other related electronic devices can be remotely connected to either LANs $820_{a-c}$ or WAN 830. The number of WANs, LANs, and routers in FIG. 8 may be increased or decreased without departing from the spirit or scope of this invention. As such, it will be appreciated that the Internet itself may be formed from a vast number of such interconnected networks, computers, and routers and that an embodiment of the invention could be practiced over the Internet without departing from the spirit and scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Figure 9:
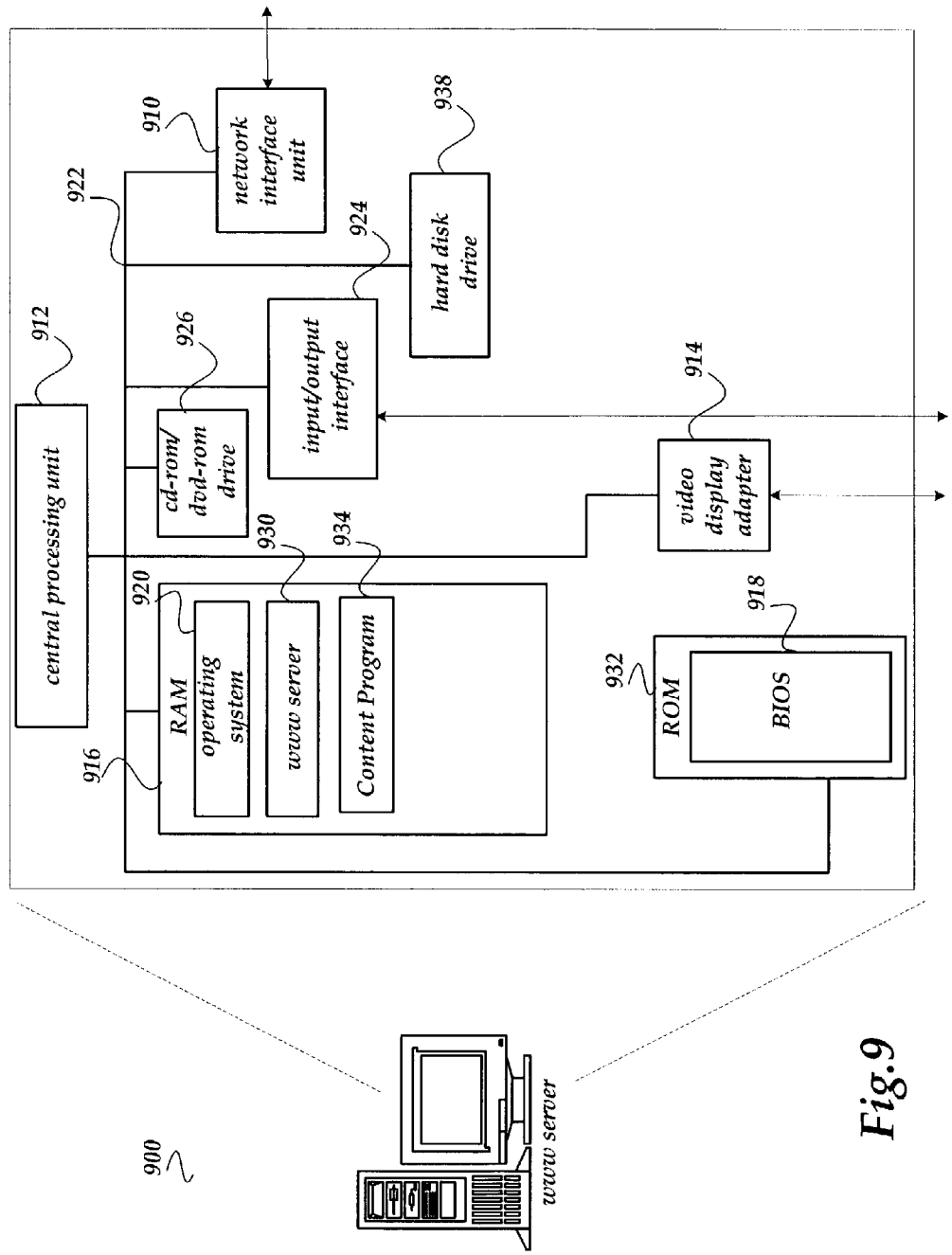

A WWW server, as described in more detail in conjunction with FIG. 9, is a computer connected to the Internet having storage facilities for storing data and running administrative software for handling requests for the stored data. A user may retrieve data from the WWW via a WWW browser application program located on a wired or wireless device, or some other requesting device or program. Upon request from the user the desired data is retrieved from the appropriate WWW server. According to one embodiment of the invention, WWW server 900 provides content, such as video content to consumers.

FIG. 9 shows an exemplary WWW server 900 that is operative to provide content. Accordingly, WWW server 900 may be configured to transmit content to requesting devices. For instance, WWW server 900 may transmit pages and forms for receiving information about a user, such as user preferences, address, telephone number, billing information, credit card numbers, and the like. Moreover, WWW server 900 may transmit video content to a requesting device that allows a consumer to obtain the content. The transactions may take place over the Internet, WAN/LAN 800, or some other communications network.

WWW server 900 may include many more components than those shown in FIG. 9. However, the components shown are sufficient to disclose an illustrative embodiment for practicing the present invention. As shown in FIG. 9, WWW server 900 is connected to WAN/LAN 800, or other communications network, via network interface unit 910. Network interface unit 910 includes the necessary circuitry for connecting WWW server 900 to WAN/LAN 800, and is constructed for use with various communication protocols including TCP/IP and WAP protocols. Typically, network interface unit 910 is a card contained within WWW server 900.

WWW server 900 also includes processing unit 912, video display adapter 914, and a mass memory, all connected via bus 922. The mass memory generally includes RAM 916, ROM 932, and one or more permanent mass storage devices, such as hard disk drive 928, a tape drive, CD-ROM/DVD-ROM drive 926, and/or a floppy disk drive. The mass memory stores operating system 920 for controlling the operation of WWW server 900. Basic input/output system ("BIOS") 918 is also provided for controlling the low-level operation of WWW server 900.

The mass memory also stores program code and data for providing a WWW site. More specifically, the mass memory stores applications including WWW server application program 930, and content application 934 (See figures and related discussion above). WWW server 900 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with external security applications (not shown), to send and receive private information in a secure fashion.

WWW server 900 also comprises input/output interface 924 for communicating with external devices, such as a mouse, keyboard, scanner, or other input devices not shown in FIG. 9. Likewise, WWW server 900 may further comprise additional mass storage facilities such as CD-ROM/DVD-ROM drive 926 and hard disk drive 928. Hard disk drive 928 is utilized by WWW server 900 to store, among other things, application programs, databases, and program data used by WWW server application program 930. For example, content databases, customer databases, and relational databases may be stored.

The above specification, examples, and data provide a complete description of the manufacture and use of the composition of the invention. Many embodiments of the invention can be made without departing from the spirit and scope of the invention.

What is claimed is:

1. A system for providing security of content within a heterogeneous distribution chain, comprising:
    a content owner having content;
    an aggregator arranged to perform the following actions:
        receiving the content, the content being encrypted with a content key, and appended to a key wrapper chain, the key wrapper chain comprising the content key, the content key being encrypted with a first encryption key;
        decrypting the content key using the first encryption key;
        decrypting the content using the content key;
        modifying the decrypted content by combining the decrypted content with at least one of a unique fingerprint or a watermark, wherein the fingerprint or watermark identifies at least the aggregator;
        employing the content key to encrypt the modified content;
        encrypting the content key with the first encryption key;
        encrypting the first encryption key using a second encryption key;
        generating another key wrapper chain by appending the encrypted content key to the encrypted first encryption key; and
        appending the other key wrapper chain to the encrypted modified content.

2. The system of claim 1, further comprising:
    a service operator arranged to perform actions, including:
        receiving the encrypted modified content and appended other key wrapper from the aggregator;
        encrypting the second encryption key using a third encryption key, wherein the third encryption key is associated with a downstream recipient;
        generating yet another key wrapper chain by appending the encrypted second encryption key to the received encrypted modified content and the other key wrapper; and
        sending the appended key wrapper chain with the encrypted modified content to the downstream recipient.

3. The system of claim 2, further comprising:
    a consumer arranged to perform actions, including:
        receiving the key wrapper chain with the encrypted modified content from the service operator;
        encrypting the third encryption key using a fourth encryption key, wherein the fourth encryption key is uniquely associated with a second consumer; and
        generating another key wrapper chain by appending the encrypted third encryption key to the received encrypted modified content, such that the generated other key wrapper chain includes at least four key wrappers in the key wrapper chain, each encryption key being encrypted by a unique different key from each other key wrapper in the chain.

4. The system of claim 1, further comprising a key manager and a key exchange arranged to manage encryption keys and decryption keys, the decryption keys relating to content that has been encrypted by an upstream provider, and the encryption keys that are used for distribution of the content.

5. The system of claim 4, wherein the key manager is further configured to manage symmetric keys of the aggregator and asymmetric keys that may be employed for at least one of signing of the content, or of encrypting the content and key exchange.

6. The system of claim 4, wherein the unique fingerprint or the watermark further comprises a copyright notice.

7. The system of claim 6, wherein the content is watermarked and fingerprinted such that a distribution path and a service provider in a market stream relating to the content are uniquely identified.

8. The system of claim 1, wherein the watermark is configured to identify the recipient of the content.

9. The system of claim 1, wherein the watermark is configured to identify a source of the content.

10. The system of claim 1, wherein the second encryption key is associated with a downstream recipient of the content.

11. The system of claim 1, wherein the aggregator further comprises a persistent security database configured to store the encrypted content.

12. The system of claim 1, wherein the aggregator further comprises a content in the clear database configured to store the decrypted content having the at least one of the unique fingerprint and the watermark.

13. The system of claim 1, wherein the clear database may be used to initiate trans-encryption in order to change the encryption properties allowing the use of legacy conditional access and consumer premise equipment in next generation networks.

14. The system of claim 1, further comprising a bridge and a key exchange configured to encrypt the content as it is transmitted to a downstream recipient.

15. The system of claim 1, further comprising a QOS API configured to enable selection of Quality of Service profiles based on system and content attributes.

16. A method for providing end-to-end security of content over a heterogeneous distribution chain, comprising:
    receiving encrypted content with key wrappers that are appended to the encrypted content, wherein the key wrappers comprise an encrypted content key and an encrypted first encryption key, wherein the content key encrypted the content, the encrypted content key being encrypted with the first encryption key, and the encrypted first encryption key being encrypted with a second encryption key;
    decrypting the content by decrypting the first encryption key using the second encryption key, decrypting the content key using the decrypted first encryption key, and thereby decrypting the content using the decrypted content key;
    embedding at least one of a unique fingerprint or a watermark into the decrypted content, wherein the fingerprint or watermark identifies at least an entity performing the content decryption;
    generating other key wrappers by appending the encrypted content key to the encrypted first encryption key, encrypting the second encryption key using a third encryption key, and appending the encrypted second to the encrypted content key, and the encrypted first encryption key;
    appending the other key wrappers to the modified content; and
    transmitting the modified content and other key wrappers over a network.

17. The method of claim 16, further comprising managing encryption keys and decryption keys, the decryption keys relating to content that has been encrypted by the provider, and the encryption keys that are used for distribution of the content to the recipient.

18. The method of claim 17, wherein managing the encryption keys further comprises managing symmetric and asymmetric keys that may be employed for at least one of signing of the content, of encrypting the content and key exchange.

19. The method of claim 17, wherein the unique fingerprint or the watermark further comprises a copyright notice.

20. The method of claim 19, wherein the content is watermarked and fingerprinted such that a distribution path and a service provider in a market stream relating to the content are uniquely identified.

21. The method of claim 16, wherein the watermark is configured to identify the recipient of the content.

22. The method of claim 16, wherein the watermark is configured to identify a source of the content.

23. The method of claim 16, wherein the content is digitally signed.

24. The method of claim 16, further comprising enabling a selection of Quality of Service profiles based on system and content attributes.

25. The method of claim 24, wherein enabling the selection of Quality of Service profiles based on system and content attributes further comprises providing an upstream content provider with information concerning the unencrypted content.

26. The method of claim 16, further comprising: detecting tampering of the encrypted content or the key wrappers, and performing a tamper detection response including at least one of terminating transmission of the encrypted content, or revoking a credential associated with access to the content.

27. The method of claim 16, further comprising determining when the provider and the recipient are a consumer, and when: ensuring that the provider loses rights to the content after the transmission.

28. The method of claim 16, wherein the identifying of the last authorized decryption agent by watermarking the agent's fingerprint to the content is performed at least one of the following times including: the time of decryption and as part of the decryption process.

29. The method of claim 16, further comprising the use of content fingerprints taken before encryption and after decryption in order to determine the quality of experience for Video and Audio service.

30. The method of claim 16, wherein in application level encryption is used in order to provide network/distribution medium transparency and persistent encryption in storage devices and caches.

31. The method of claim 16, wherein selective encryption is used in order to provide network/distribution medium transparency and persistent encryption in storage devices and caches.

32. A system for providing end-to-end security of content over a heterogeneous distribution chain, comprising:

means for receiving encrypted content with key wrappers that comprise a content key that is encrypted with a first encryption key, and the first encryption key that is encrypted with a second access;

means for determining when to inspect the content; and when:

means for decrypting the content using the keys in the key wrappers;

means for adding at least one of a unique fingerprint and a watermark to the decrypted content, wherein the fingerprint or watermark provides information about the decryption means;

means for wrapping and encrypting the decrypted content; and means for generating and appending other key wrappers that comprises the encrypted content key, encrypted first encryption key, and encrypted second encryption key, wherein the encrypted second encryption key is encrypted with a third encryption key.

* * * * *

UNITED STATES PATENT AND TRADEMARK OFFICE
CERTIFICATE OF CORRECTION

PATENT NO. : 7,328,345 B2
APPLICATION NO. : 10/354920
DATED : February 5, 2008
INVENTOR(S) : Morten et al.

It is certified that error appears in the above-identified patent and that said Letters Patent is hereby corrected as shown below:

On The Title Page Item -56-
On page 2, under "Other Publications", in column 2, line 5, delete "Multmedia" and insert -- Multimedia --, therefor.

On The Title Page Item -56-
On page 3, under "Other Publications", in column 2, line 5, delete "Immage" and insert -- Image --, therefor.

On The Title Page Item -56-
On page 3, under "Other Publications", in column 2, line 9, delete "Confernece" and insert -- Conference --, therefor.

In column 2, line 3, delete "(VoD) )" and insert -- (VoD) --, therefor.

In column 7, line 47, delete "MPEG 2" and insert -- MPEG2 --, therefor.

In column 7, lines 48-49, delete "MPEG 2" and insert -- MPEG2 --, therefor.

In column 8, line 30, delete "APT" and insert -- API --, therefor.

In column 9, line 13, delete "(M))." and insert -- (M). --, therefor.

In column 9, line 54, after "A/k" insert -- . --.

Signed and Sealed this

Twenty-seventh Day of May, 2008

JON W. DUDAS
*Director of the United States Patent and Trademark Office*